United States Patent [19]

Lewin

[11] Patent Number: 4,774,658

[45] Date of Patent: Sep. 27, 1988

[54] STANDARDIZED ALARM NOTIFICATION TRANSMISSION ALTERNATIVE SYSTEM

[76] Inventor: Thomas Lewin, 24 Park La., Minneapolis, Minn. 55416

[21] Appl. No.: 14,852

[22] Filed: Feb. 12, 1987

[51] Int. Cl.$^{4}$ .............................................. G06F 15/20

[52] U.S. Cl. .................................................... 364/200

[58] Field of Search ... 364/200 MS File, 900 MS File

[56] References Cited

U.S. PATENT DOCUMENTS 4,460,960 7/1984 Anderson et al. .................. 364/200

*Primary Examiner*—Raulfe B. Zache

*Attorney, Agent, or Firm*—Hugh D. Jaeger

[57] ABSTRACT

An event notification system utilizing a common communication protocol, a common order of data presentation, and a common field size for each data block so that at least one receiving terminal location at any location is able to receive event notification messages from at least one central station computer at participating company's central station. Security access codes are provided, assuring that receiving terminal locations and central station computers are only able to recognize, send and receive messages with each other.

16 Claims, 6 Drawing Sheets

| Field Description | #char |
|---|---|
| Message Code<br>'A' = event data<br>'T' = test (same data as event,<br>(but only a communications test) | 1(A) |
| Current Data and Time (message ID)<br>YYMMDDHHMMSS (in Subscriber's local time): | 12(N) |
| Subscriber Name<br>(Name shown at protected location rather than<br>corp. ID) | 32(AN) |
| House Number (or business number) | 8(AN) |
| House Number Suffix (apartment number, floor, suite) | 4(AN) |
| Street Directional | 2(A) |
| Street 48(AN) | |
| Alternate Street Address<br>If street address at CSC is not broken into<br>the fields above, it is stored as one line here. | 62(AN) |
| Community (city) | 32(AN) |
| State (2A) | |
| ZIP Code | 9(N) |
| System Type (ABA, SBA, FA, HU, EMS, etc.)<br>(Note: ABA = audible burglar alarm,<br>SBA = silent BA). | 4(A) |
| Event Type (alarm, inspection, restore, outage, etc.) | 7(AN) |
| Location (Zone: i.e., front, rear, interior, etc.) | 10(AN) |
| Triggering Device Type<br>(Door Sw, Safe, Motion, Water Flow, etc.) | 10(AN) |
| Agent Responding ('Y' or 'N') | 1(A) |
| Key Holder Responding<br>('Y', 'N', or 'C' [attempting to contact]) | 1(A) |
| Permit Number | 15(AN) |
| Signal Code (generally used for Fire-Dept-issued codes) | 15(AN) |
| Monitoring Central Station Name | 32(AN) |
| Monitoring Central Station Telephone Number | 10(N) |
| Secondary Contact Name | 32(AN) |
| Secondary Contact Telephone Number | 10(N) |
| Date and Time of original signal TO Central Station<br>HHMM (hour and minute) | 4(N) |
| Date and Time of Most Recent Event from this alarm<br>system sent to this agency (YYMMDDHHMM) | 10(N) |
| Special Information<br>(location assist, handicapped, special hazards) | 80(AN) |
| Operator Instructions (from CSC operator) | 80(AN) |
| Scheduled System Inspection? (Y/N) | 1(A) |
| Number of Annual Inspections? (1 to 52) | 2(N) |
| Date of Last Inspection (YYMMDD) | 6(N) |
| Subscriber Primary Person Contact Name | 32(AN) |
| "Sent-to" Terminal Name and City 2 lines @ | 32(AN) |

FIG. 5

ALARM SYSTEM
EVENT NOTIFICATION REPORT
(SAMPLE FORM)

Message Transmission Date & Time: 11/03/86 23:08:30

Name: General Manufacturing Corp.

Street Address: 10832 #308 NE Jackson Blvd

City: Minneapolis State: MN ZIP: 55402-2345

System Type: AFA Event Type: Alarm

Location: 3rd Flr Triggering Device: Smoke Det

Agent Responding? N Key Holder Responding? C

Permit Number: 32051 Signal Code: 38C15(MFD)

Monitoring Central Station: Security CS

Central Station Phone No.: (201)332-0123

Secondary Contact Name: Mdwst Patrol

Secondary Contact Phone No.: (612) 332-9943

Time of Event: 23:07:15

Date & Time of Most Recent
Previously Reported Event: 02/10/86 03:15

Special Information: Fire Stairwell Access from Rear; HCL in Mfg. area

Central Station Operator Comments:

User Primary Contact Name: John Doe

This Message Sent to: Fire Department - Minneapolis

FIG. 6

STANDARDIZED ALARM NOTIFICATION TRANSMISSION ALTERNATIVE SYSTEM

BACKGROUND OF THE INVENTION

1. Field of the Invention

The present invention pertains to a data storage and transmission system, and more particularly, pertains to an event notification system to enable alarm companies to automate response methods of notifying second parties, such as police departments, fire departments, integrated emergency communication centers, corporate subscriber headquarter locations, insurance organizations, and other like business entities. The present invention provides a standard communications protocol of transmitting information, as well as a uniform presentation of transmitted data.

2. Description of the Prior Art

Previously, notification of police and fire departments of events requiring such public agency response was verbal by telephone, written or printed and sent by mail, or merely a multiple digit code via a dedicated telephone circuitry. This required a manual look-up at the receiving end to determine the location name and related information which transmitted the referenced alarm code, or total reliance upon the accuracy of the verbally presented information, the ability of the public agency operator to be accurate in the way that he or she wrote down the information, and that all of the information was received.

U.S. Pat. No. 4,141,006, issued Feb. 20, 1979, to Braxton entitled "Security System for Centralized Monitoring and Selected Reporting of Remote Alarm Conditions" is prior art. The processor system includes a terminal for delivering alarm message reports, such as to a local law enforcement agency. However, each terminal is dedicated to the serving central stations's own computer and is thus not available for other central stations to use and share.

The present invention overcomes the disadvantages of the prior art by providing for an event notification system for transmitting from a multiplicity of central stations into a multiplicity of broadly accessible receiving location terminals.

SUMMARY OF THE INVENTION

1. System Overview

The APPLICANT Event Notification System will provide a significant increase in the quality and reliability of communication between central stations and the many agencies and organizations that need accurate alarm system related information, promptly delivered.

The APPLICANT Event Notification System will provide a high level of security-of-access between central stations and data terminals. That means the police and fire departments receiving information will know that only authorized central stations will be able to send them event messages. Unauthorized companies, individuals, terrorists, and so on, will not be able to send false messages to tie up police and/or fire department personnel with bogus alarm transmissions.

Alarm systems in residences and businesses are most often monitored by alarm company central stations. These central stations receive various signals from control equipment located on protected premises (i.e. at subscriber locations). Some signals alert the central station to immediate emergencies like burglary, fire, hold-up, and medical emergency. Other signals indicate non-immediate emergencies such as heating system failure, industrial process system malfunction, or power outage. Additional signals may merely report equipment or wiring problems within the alarm systems themselves.

When police fire department, or paramedic notification is appropriate, a central station operator will pick up a telephone, dial the appropriate public response agency, and tell the responding person which alarm company is calling, the name and address of the subscriber, the type of protection being provided (burglar alarm, fire alarm, etc.), and whatever additional information is important. Sometimes such information will include directions for finding the address, the location of the sensor detecting the emergency, and the type of sensor involved.

The provided information is then verbally relayed to responding squad cars, fire stations, and/or ambulances by the public response agency's dispatcher.

The acceptance and use of various kinds of alarm systems has increased significantly over the years. While the reliability of these systems has similarly increased, any momentary problem, as well as real emergencies, will cause an "alarm" to be triggered. Thus, the response burden placed on public response agencies has increased many-fold. Some agencies have reduced the priority level assigned to alarms. All agencies see the ever-increasing volume of calls as an existing or potential problem both from a cost standpoint, as well as from an availability-of-personnel standpoint.

APPLICANT proposes to automate the transmission of alarm data to public emergency response agencies, and to enable such agencies that are also equipped with Computer Aided Dispatch (CAD) systems to transfer alarm information to their CAD systems, and even to send it to mobile terminals in responding vehicles (squad cars) at the push of a button. That will means fewer transmission errors between the central station and the responding police, fire, or medical personnel, and no loss of important information regarding the subscriber experiencing the emergency.

Communication between central stations and police and fire departments is generally made using the "public switched network". In some instances individual alarm companies or municipalities opt to use special dedicated telephone circuits and to continuously monitor the integrity of such circuits. The APPLICANT system will permit not only the continued use of such dedicated circuits, but will also permit central stations to use packet switched data networks which provide high levels of supervision and end-to-end data channel reliability, particularly when alarm messages must be sent across the country.

A few central station alarm companies currently offer their subscribers some type of automated alarm signal retransmission from their central stations to police and/or fire departments. However, each such alarm company uses its own equipment and transmission link for each department, as well as its own data protocols and document format. Therefore, very few police or fire departments accept such equipment at their facilities. They recognize that if they provide terminal equipment space for one alarm company, too many others will follow, and with no uniformity of data and document format, the information provided is more confusing than helpful.

APPLICANT proposes to establish "standard" transmission protocols, "standard" document files, sizes for each data field in the documents, form layouts, and terminology. APPLICANT proposes to provide receiving computers (Terminals) at many locations so that all central stations that monitor subscriber alarm installations in jurisdictions where such Terminals are located, will be able to automatically send alarm information to these Terminals. *With these "standards" established, a single Terminal at each location will be able to serve all central stations.* Where necessary due to high volumes of alarm messages, a Terminal will be able to process incoming calls on more than one telephone line simultaneously. If a central station alarm company needs a direct line (dedicated channel), or packet switched network access, appropriate provisions will be made to enable such communication links to function. APPLICANT will thus not only increase the accuracy and reliability of alarm system related event notification messages to law enforcement and fire agencies, but will enable central stations to share the cost of Terminals.

These are needs for Terminals at additional locations. Where a major corporation has multiple plant locations, or many retail stores, the departments in charge of security and/or loss prevention have a need to know when emergencies occur at any of their facilities. In many instances, such corporations buy their alarm services from more than one vendor. A single Terminal, addressable from any central station, enables all alarm companies to provide news of alarms, routine system inspections, trouble, and other events in a uniform manner, readily understandable by appropriate corporate personnel.

Similarly, insurance carriers and/or brokers can profit from knowing the loss history of their insured. Even when insurance policy "deductible" amounts are high, frequent small fires, for example, should present cause for reconsidering the attractiveness of a fire insurance policy for a particular subscriber (insured), or subscriber location. Corrective measures may be suggested that will have the subscriber losses, whether or not they are covered by insurance.

APPLICANT may also offer "event analysis" services both to subscribers and alarm companies. Such analysis may support alarm company claims to more reliable systems than their competitors provide, and may qualify or verify a lack of "false alarms" as well as the reliability and frequency of scheduled alarm system inspections. Subscribers may also be interested in knowing how their systems and their central stations stack up against competing alarm companies.

The APPLICANT Event Notification Service involves a network of central station computer terminals (CSCs) that are able to communicate with Terminals located at police and fire departments, combined Emergency Communication Centers (ECCs), subscriber headquarter locations, insurance-related organizations, fire marshall offices, and at APPLICANT. A central computer, located at APPLICANT, will enable all CSCs and all Terminals to have correct and current secret identification and access codes so that only authorized alarm companies will be able to contact the Terminals.

Where central stations have their own existing computers that monitor alarm installations, APPLICANT software can be incorporated into their existing alarm monitoring computers.

1.1 Glossary

ACCESS CODE

A "Security Access Code" which, together with a CSC's unique ID code, is required in order to make initial contact with any Terminal.

AHJ

The "Authority Having Jurisdiction" is generally a fire-protection-system-related agency such as Insurance Services Offices (ISO), Factory Mutual (FM), Fire Marshall, city building inspector, etc.

CAD

Computer Aided Dispatch system located at various ECC facilities.

CAD INTERFACE

The Terminal's option RS-232 port that permits the Terminal to "talk to" an ECC Computer Aided Dispatch (CAD) System.

CENTRAL STATION

Central Station alarm companies that monitor alarm systems installed subscriber at locations.

CENTRAL STATION ID

A unique code assigned to each CSC. It identifies that CSC as the originator of any messages it sends to a Terminal. The Terminal must recognize the CSC's ID as an authorized ID before the Terminal will accept any message.

CSC

Central Station Computer. In this document, "CSC" refers to the computer hardware and software that is integral to this patent application. It sends event information to Terminals at remote locations. The CSC is in no way intended to replace a central station's existing, or future, alarm monitoring computer system. However, some or all of the CSC may eventually become incorporated into central stations alarm companies' own alarm monitoring computers.

ECC

Emergency Communication Centers. These are the communication and control centers for police, fire, and/or paramedic departments. These may serve individual agencies or multiple departments in one or more cities or counties. Personnel located at ECCs transmit emergency messages to responding personnel, usually by voice radio transmissions, but sometimes via packet switched messages to in-vehicle terminals (which are in no way to be confused with "Terminals" referenced throughout this document).

EVENT

An Event is generated by the central station. Many signals are routinely received at the central station, and every signal indicates a change-of-status at some subscriber location. However, not all signals will be "Events" that require retransmission to APPLICANT "Terminals". The particular situation at each subscriber will determine which central-stationreceived signals will be treated as Events. Some signals, for example, may be "Events" if they happen during one part of the day or night, but not at other times. Other Events will be generated as a result of subscriber telephone calls to the central station and not as a result of some signal, as when an alarm system or a sprinkler system is to be "out of service" for some period of time. The central station will provide, in each subscriber's data base, information as to which types of events are to be sent to one or more Terminals, and the central station will then, either automatically or manually, inform the CSC when such an Event occurs. The CSC will then know which Terminals to notify, and in which order of priority. Events may be totally unrelated to alarm systems and event messages may be initiated by guard companies, chemical manufacturers/processors, and health care providers, to cite a few examples and not to be construed as limiting of the present invention.

INSPECTION

A system inspection is a field test of an actual alarm installation. Reports of such inspections may be required for transmission to non-ECC Terminal locations. Such reports should not be confused with TESTS as defined herein.

PRIMARY KEY

The field within a record which is used to find (search for) the record. For example, when you want to find a subscriber record, if the field that you want to type in to find that record is that subscriber ID field, then the subscriber ID field should be used as the primary key. The software responsible for record retrieval should treat this field specially and organize an index for it so that records may be retrieved quickly (i.e. without having to read sequentially through the file looking for the desired record).

SECONDARY CONTACT (ALARM OR GUARD RESPONSE COMPANY)

A central station may monitor subscribers under contract to another alarm company. Such an alarm company is called the Secondary Contact. Signals go from the subscriber directly to the central station. A secondary contact could be the installing company, the servicing company, or a guard service. In many instances, the central station will serve all functions, and no secondary contact may exist.

SIGNAL

A signal may be an alarm, an alarm system inspection, a notification of system shut-down, an open, a close, a system restore, etc., that is detected and sent to the Central Station by a Transmitter.

SUBSCRIBER

The physical location at which a specific alarm system, consisting of one or more transmitters, is installed. The alarm system may detect one or more conditions such as burglary (BA), fire (FA), medical emergencies (ME), hold-up (HU), etc., and report events to the central station.

SUBSCRIBER HQ

The home office, regional office, or some other facility, other than the subscriber location, to which notification of Events at the subscriber location may have to be sent. Such Event notifications will be sent by a CSC to the subscriber headquarters Terminal.

SYSTEM MANAGEMENT COMPUTER

Computer that assigns and stores CSC identification codes and Terminal Access codes and is able, on demand via telephones requests from CSCs and Terminals, to provide said needed and such codes.

TERMINAL

Terminals are the remote receiving computers located at ECCs, Subscriber headquarter locations, Insurance agencies, Insurance brokers, AHJs, and possibly also at APPLICANT.

TEST

This refers to a test of the communication link between a CSC and a Terminal. A test of the ability of the CSC to access the Terminal and to verify that the date needed to connect is correct, and that the circuits used function properly.

TRANSMITTER

A transmitter is a hardware device at the subscriber's location which transmits signals to the central station when certain conditions occur. A transmitter may detect a single condition (I.E. fire (FA), hold-up (HU), etc.), or several types.

BRIEF DESCRIPTION OF THE DRAWINGS

FIGS. 3A–3E illustrate the progression from a central station computer to an automated central station system with integrated central system computer software;

FIG. 5 illustrates a proposed uniform standardized order of presentation data fields and standardized maximum field size for each data field; and, FIG. 6 illustrates a proposed example of an event notification report.

DESCRIPTION OF THE PREFERRED EMBODIMENTS

Figure 1:
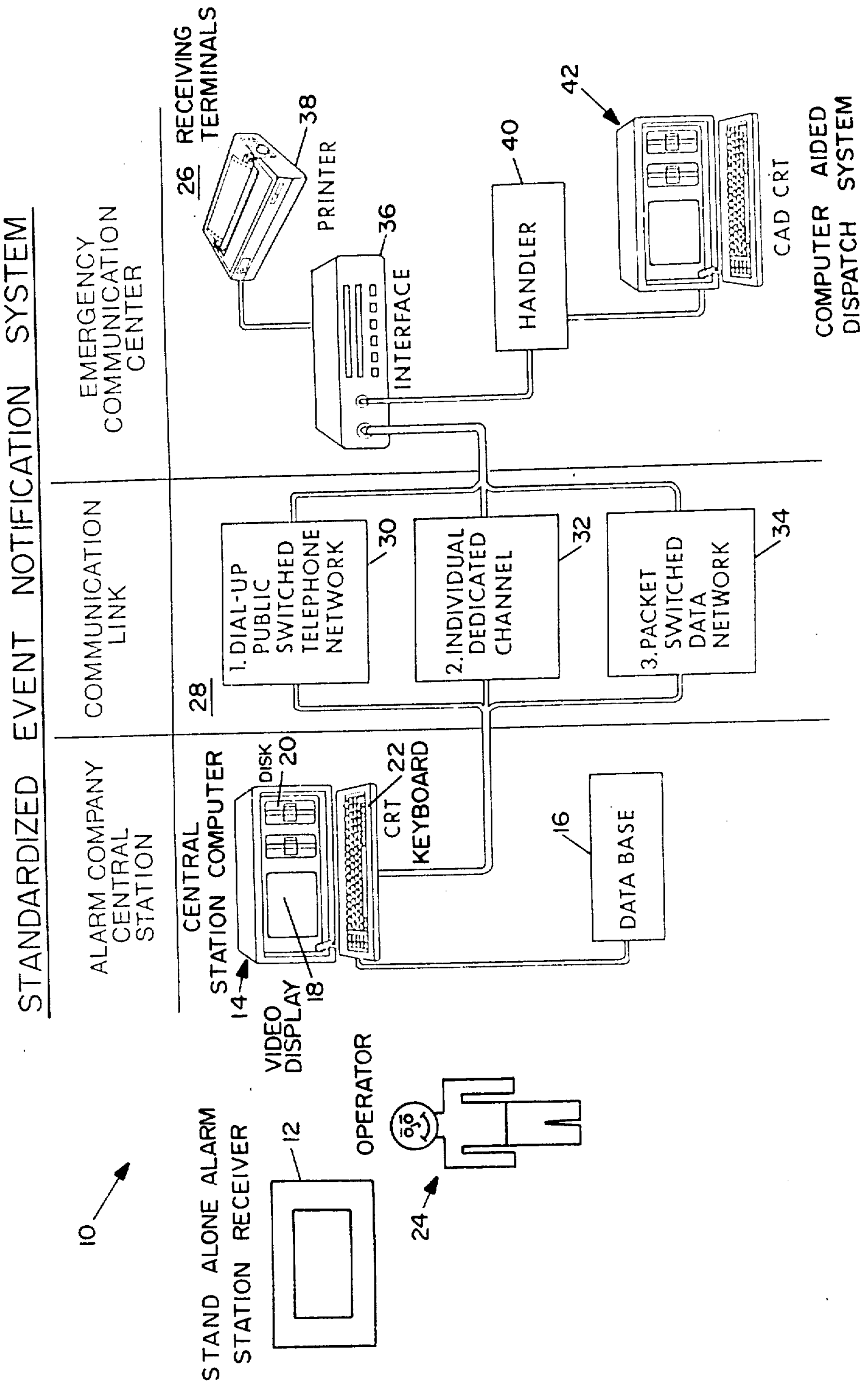
FIG. 1 illustrates a block diagram for the event notification system.

FIG. 1 illustrates a block diagram of an event notification system 10 including a stand-alone alarm station receiver 12 for receiving alarm messages. A central station computer 14, including a central processor unit with memory and a hard disk storage, connects into a database 16 and includes a video display 18, one or more floppy or hard disks 20, and a keyboard 22. On receiving of an alarm at the alarm company central station receiver 12, an operator 24 observing the screen 18 while receiving other feedback from the alarm company central station, will cause a transfer of information to the central station computer 14, subsequently causing the transmission using a standard communication protocol of a standardized order presentation of data fields in a standardized field size for each data field to one or more receiving terminals 26 by way of a communication link 28. The information can be transmitted over the public switched dial-up telephone network 30, a dedicated communication channel 32, or a data network 34. The receiving terminal can include an interface 36, a printer 38, and a handler 40, for connection into an agency's computer aided dispatch system (CAD) 42, which system is not part of this patent application.

Figure 2:
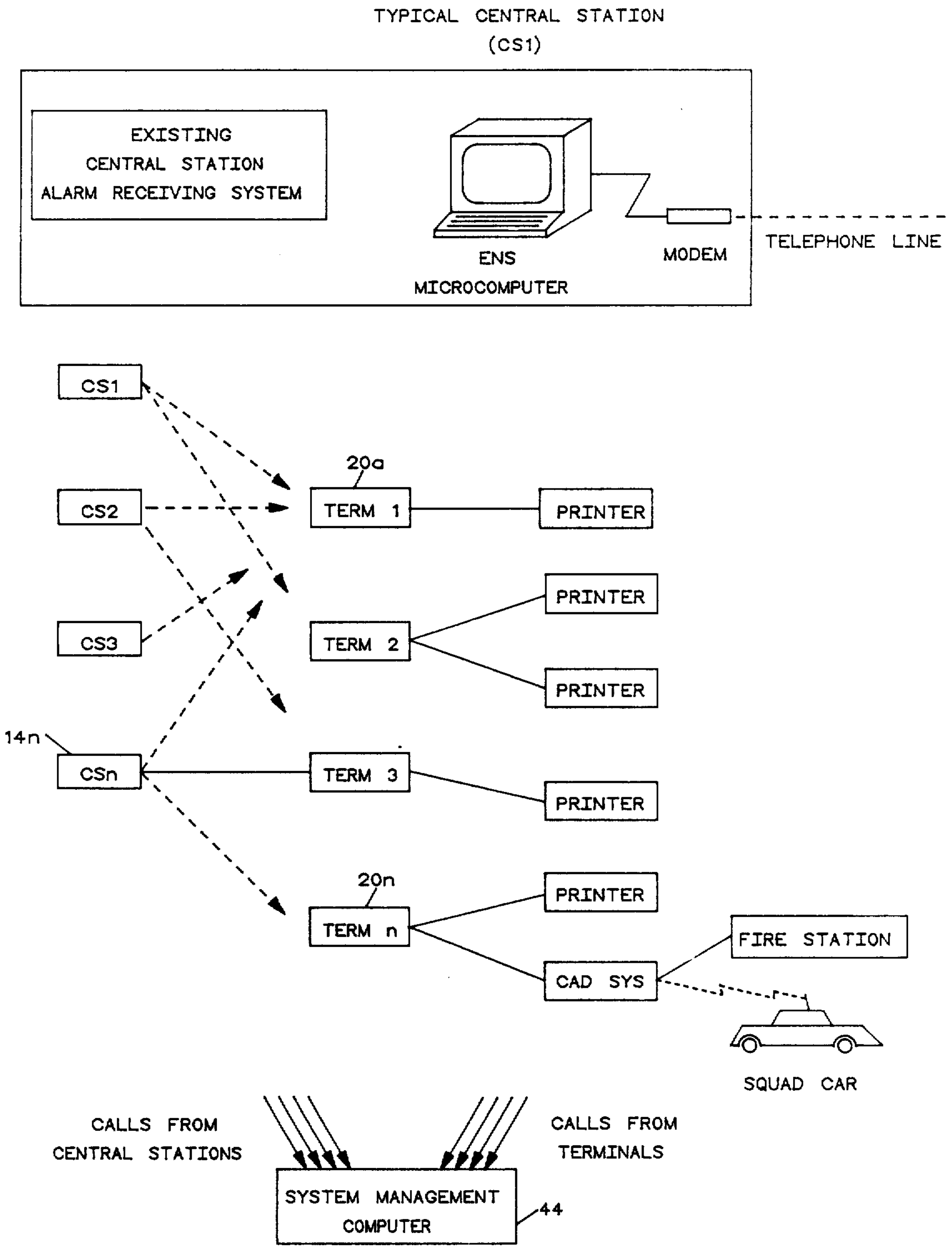
FIG. 2 illustrates a replication expansion of the central station computers, the receiving terminals, and the system management computer communicating with each of the others.
Figure 3A:
Figure 3B:
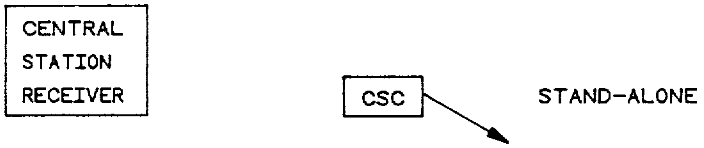
Figure 3C:
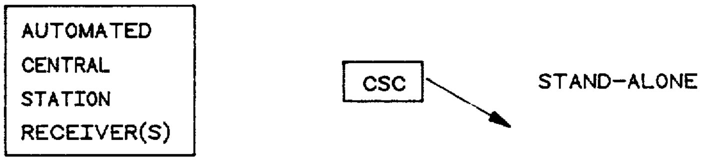
Figure 3D:
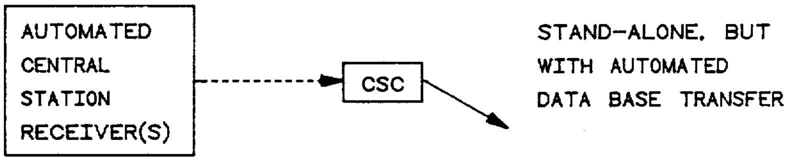
Figure 3D:
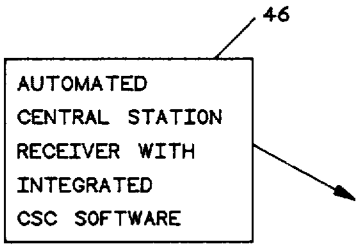
Figure 4A:
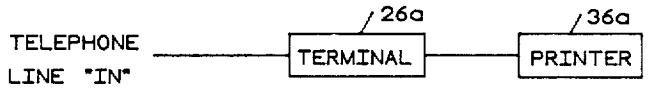
FIGS. 4A–4D illustrate different Terminal configurations.
Figure 4B:
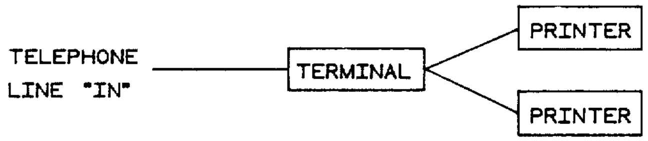
Figure 4C:
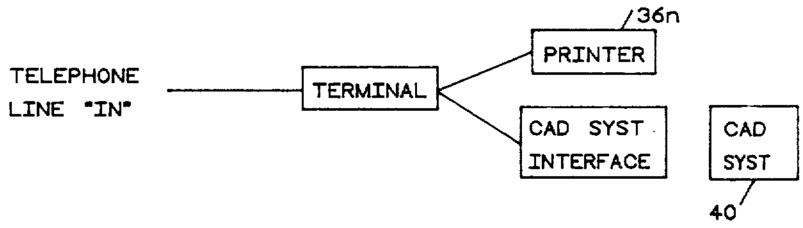
Figure 4D:
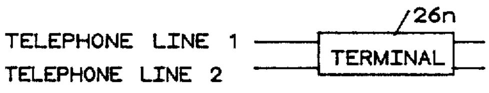

FIG. 2 illustrates a block diagram of central station computers 14*a*-14*n* communicating to receiving Terminals 26*a*-26*n*. A system management computer 44 can communicate and receive calls from the central station computers 14 and the receiving Terminal 26. All messages between a central station computer and receiving Terminal originate at the central station computer 14. All communications between the central station computer 14, the Terminals 26 and the system management computer 44 is initiated by the central station computers 14 and the Terminals 26. The receiving Terminals 26 cannot call the central station computers 14. The system management computer 44 cannot call the central station computers 14 or the Terminals 26.

FIGS. 3A-3E illustrate the integration of a standalone central station computer 12 into an automated central station receiving system with integrated central station computer software 46.

FIG. 4A-4D illustrate configurations for receiving Terminals, printers, and a computer dispatch interface and terminal attached to the terminal.

2. HARDWARE AND SYSTEM SOFTWARE SPECIFICATIONS

2.1 Central Station 2.1.1 Computer

The computer at the CSC is an IBM PC or compatible. The PC is equipped with main memory and at least one standard 360K floppy disk drive, and either a second floppy disk drive or a fixed disk drive. It also has one IBM compatible serial port for modem communications and a printer port.

2.1.2. Printer

The printer is capable of handling standard eight and a half by eleven inch fan-folded paper.

2.1.3 Modem

The modem connected to the CSC is capable of transmitting data at 300 or 1200 baud. Higher baud rates may be offered.

2.2 Terminal 2.2.1 Computer

The computer at a Terminal is capable of supporting multi-tasking operation. The terminal computer has main memory, at least one standard 360K floppy disk drive, and either a second floppy disk drive or a fixed disk drive. It has one or two serial ports for modem communications and one or two printer ports. An optional third port may be installed for CAD interfacing.

2.2.2 Printer

The printer is capable of handling standard eight and a half by eleven inch fan-folded paper, or one of several custom size fan-folded forms. The Terminal has one or two printers connected to its computers.

2.2.3 Modem

The modem connected to the Terminal is capable of receiving data at 300 or 1200 baud. Higher baud rates can be offered.

2.3 System Management Computer 2.3.1 Computer

The computer at System management computer has has at least 640K of main memory, related floppy and fixed disk data storage units, at least one printer, and one or more modems capable of receiving data at 300 and 1200 baud.

3. DATA COMMUNICATIONS SPECIFICATIONS

There are three main features in the data communications system. One is a protocol that is highly accurate. Two is protocol efficiency in terms of delivering the data as quickly as possible. The message protocol transmits variable length fields without padding out unused character positions. The third feature is a protocol that can be implemented on a wide variety of minicomputers and mainframes, as well as microcomputers. It is anticipated that alarm companies will want to modify software on whatever alarm system receiver they use so that it can support message transmissions to the Terminals. Therefore, the protocol does not depend on hardware capabilities found in PC's that may not be available on a given alarm company's host alarm receiver computer.

The software is designed in a modular fashion so that there is one piece of code which handles the protocol details at the transmission level and passes the data along to the rest of the program. If additional protocol support is necessary, this piece of code is expanded without affecting the rest of the program.

3.1 Transmission Protocol and Error Recovery

The transmission protocol for messages between CSCs and Terminals is based on the popular Kermit protocol by way of example and for purposes of illustration only and not to be construed as limiting of the present invention. Any other like language and protocol can be utilized. This protocol is in the public domain, and has been implemented successfully on a wide variety of microcomputers, minicomputers, and mainframes.

The following characteristics of the Kermit protocol have been adopted for message transmissions between CSCs and Terminals:

Communication is over ordinary RS-232 connections.

Communication is half duplex. Data is not echoed by either side as it is received.

The packet length is variable up to a maximum length of 96 characters. Logical records longer than 96 bytes are partitioned into smaller packets.

Packets are sent in alternate directions. A reply is required for each packet.

A time-out facility is used to allow transmission to resume after a lost packet.

All transmission is in ASCII. Any non-ASCII hosts are responsible for conversion. ASCII control characters are prefixed with a special character and then converted to printable characters during transmission to ensure they arrive as sent. A single ASCII control character (normally SOH [start of header]) is used to mark the beginning of a packet. The content of all of these fields, except for the TYPE field and the DATA field, is dictated by the Kermit protocol itself rather than by the application program. Kermit defines a few values for the TYPE field (such as ACK and NAK), but the application program may define additional values that have meaning only when communicating with other application programs that understand those values. The DATA field of a Kermit program is defined entirely by the application. Communicating Kermit applications must agree on the content of the DATA field for each defined packet type. The TYPE field of the packet determines the packet type. The content of the TYPE and DATA fields of each packet are described in detail in the "MESSAGE PROTOCOL" and "MESSAGE FORMATS" sections that follow.

When a CSC first makes connection with a Terminal it sends a "SendInit" packet. The MAXL, TIME, NPAD, PADC, EOL, QCTL, QBIN, CHKT, and REPT are all filled in with appropriate values for the CSC. The value for the CHKT field is a 3. The 3 in this field indicates that the CRC-CCITT method is used for error detection. The Terminal software is equipped to handle this method. Initially, values of 1 and 2 are being accepted (indicating weaker checksum error detection methods). At some point, however, data accuracy requirements may dictate that only transmissions using the stronger CRC error checking method be accepted.

The following values are used in the PC based CSC software and Terminal software for the SendInit and corresponding ACK:

MAXL—94
TIME—1 (second)
NPAD—0
PADC—0 (ignored since NPAD is zero)
EOL—0 (no special character is required to Terminate packets)
QCTL—'#'
QBIN—0 (no binary data needs to be transmitted)
CHKT—3 (CRC-CCITT error detection method)
REPT—' '

3.2 Message Protocol 3.2.1 CSC to Terminal

When a CSC connects with a Terminal, the first packet exchange is the SendInit packet to the Terminal and the corresponding ACK, as defined by Kermit protocol. At this point, the two computers are ready to begin the actual exchange of application data.

The next packet exchange is the CENTRAL—STATION—ID packet and its corresponding ACK. The CSC sends its ID code and the Terminal's access code. If the Terminal recognizes the ID code and its access code, it responds by sending an ACK packet with that Terminal's ID code in the data portion. The Terminal also sends its name, city, and state (separate by line feeds) along with its ID code. If either side fails to recognize the other's ID or access code, communication is terminated immediately and appropriate error messages are printed at both ends (including the data and time). If the ID packet exchange succeeds, the CSC saves the name, ciy, and state of the Terminal so that it can include this information in the printout of the message contents.

After the exchange of ID packets, the CSC sends the EVENT_DATA message. This message is identical in format whether it is sent to a Terminal at an ECC site, a corporate subscriber HQ, or another location. Details of the format of this message are given in Section 3.3.2. The message may consist of several physical packets. Each one is ACKed by the Terminal.

The CSC then sends a LOG_CONFIGURATION_REQUEST message asking whether the EVENT_DATA message was successfully recorded on the disk and on the printer. The Terminal responds with an ACK containing that information. Error conditions such as disk full condition, disk write errors, printer out of paper, printer not on-line, etc., causes an error code to be returned as part of the ACK message.

The CSC then sends an OPERATOR_CONFIRMATION_REQUEST asking whether an operator has seen the message. The Terminal responds with an ACK containing the appropriate information. In the case of a Terminal computer at an ECC site (i.e. a 24-hour attended site), the operator indicates the appropriate response. At non-ECC sites (i.e. non-24-hour attended sites), the Terminal software immediately responds with a code indicating that no operator is present. The CSC software is aware of which Terminals are ECC sites and generates an error message if an ECC Terminal is accidentally or maliciously programmed to return the "operator not present" code.

The CSC then sends a GOODBYE message. The Terminal sends an ACK and both sides hang up.

3.2.2. Terminal to CAD

After receiving a message from CSC, a Terminal needs to forward the message on to the attached CAD system, if there is one. The CAD Protocol field in the Terminal ID file tells whether or not a CAD system is attached. The CAD system is attached to an RS-232 port on the Terminal. Normally this is direct cable connection, although modems can be used if the building layout makes direct connections impractical. The APPLICANT protocol for CAD interfacing is designed to include sophisticated error detection and retry logic to permit modem use and also to recover from the inevitable (albeit infrequent) transmission errors which occur even over direct connections.

When the Terminal wants to forward a message to the CAD system, it first attempts to send a SendInit packet, as defined by Kermit protocol. If there is no response, it will continue trying a predetermined number of times before giving up, as per Kermit protocol. If the CAD system is ready to receive the message, it responds to the SendInit packet with an ACK, as defined by Kermit protocol.

Next the Terminal sends the EVENT_DATA message, in exactly the same format as it received it from the CSC, or in the format to which the Terminal has been programmed to present the received EVENT_DATA message. Details of the format of the EVENT_DATA message are given in Section 3.3.2. The message may consist of several physical packets. Each one is ACKed by the CAD system.

The Terminal then sends an OPERATOR_CONFIRMATION_REQUEST asking whether the CAD operator has seen the message. The CAD system responds with an ACK containing the appropriate information.

The response codes in this ACK are the same as those for the ACK from the Terminal to the CSC's OPERATOR_CONFIRMATION_REQUEST message. Note that the CAD software will need to receive input from the operator before it can respond to the Terminal's request.

The Terminal then sends a GOODBYE message. The CAD system then sends an ACK.

3.3 Message Formats

The following message types are described in this section:

CENTRAL_STATION_ID
EVENT_DATA
LOG_CONFIRMATION_REQUEST
OPERATOR_CONFIRMATION_REQUEST 3.3.1 CENTRAL_STATION_ID Message The CENTRAL_STATION_ID message has the following format:

Type="I"
Data=Up to 15 ASCII alphanumeric characters representing the Central Station ID, terminated by a line feed, followed by up to 15 alphanumeric characters representing the access code, terminated by a line feed.

The corresponding ACK from the Terminal is in the following format:

Data=Up to 15 ACKII alphanumeric characters representing the Terminal ID.

FIG. 5 illustrates a proposed uniform standardized order of presentation data fields and standardized maximum field size for each data field in the EVENT_DATA message as also set forth below in Table 1.

TABLE 1

| Field Description | # char |
|---|---|
| Message Code | 1(A) |
| 'A' = event data | |
| 'T' = test (same data as event, | |
| but only a communications test) | |
| Current Data and Time (message ID) | 12(N) |
| YYMMDDHHMMSS (in Subscriber's local time): | |
| Subscriber Name | 32(AN) |
| (Name shown at protected location rather than | |
| corp. ID) | |
| House Number (or business number) | 8(AN) |
| House Number Suffix (apartment number, floor, suite) | 4(AN) |
| Street Directional | 2(A) |
| Street | 48(AN) |
| Alternate Street Address | 62(AN) |
| If street address at CSC is not broken into | |
| the fields above, it is stored as one line here. | |
| Community (city) | 32(AN) |
| State | 2(A) |
| ZIP code | 9(N) |
| System Type (ABA, SBA, FA, HU, EMS, etc.) | 4(A) |
| (Note: ABA = audible burglar alarm, | |
| SBA = silent BA). | |
| Event Type (alarm, inspection, restore, outage, etc.) | 7(AN) |
| Location (Zone: i.e., front, rear, interior, etc.) | 10(AN) |
| Triggering Device Type | 10(AN) |
| (Door Sw, Safe, Motion, Water Flow, etc.) | |
| Agent Responding ('Y' or 'N') | 1(A) |
| Key Holder Responding | 1(A) |
| ('Y', 'N', or 'C' [attempting to contact]) | |
| Permit Number | 15(AN) |
| Signal Code (generally used for | 15(AN) |
| Fire-Dept-issued codes) | |
| Monitoring Central Station Name | 32(AN) |
| Monitoring Central Station Telephone Number | 10(N) |
| Secondary Contact Name | 32(AN) |
| Secondary Contact Telephone Number | 10(N) |
| Date and Time of original signal TO Central Station | 4(N) |
| HHMM (hour and minute) | |
| Date and Time of Most Recent Event from this alarm | 10(N) |
| system sent to this agency. (YYMMDDHHMM) | |
| Special Information | 80(AN) |
| (location assist; handicapped; special hazards) | |
| Operator Instructions (from CSC operator) | 80(AN) |
| Scheduled System Inspection? (Y/N) | 1(A) |
| Number of Annual Inspections? (1 to 52) | 2(N) |
| Date of Last Inspection (YYMMDD) | 6(N) |
| Subscriber Primary Person Contact Name | 32(AN) |
| "Sent-to" Terminal Name & City 2 lines @ | 32(AN) |

3.3.2 EVENT_DATA message

The EVENT_DATA message has a variable length format and may be spread out over several packets. Each field must occur in the order specified in FIG. 5, and can have no more than the maximum number of characters. Longer fields will be truncated. Each field is terminated by a line feed. If the CSC has a problem sending a raw line feed character, it may be quoted using the normal Kermit mechanism. The fields are as in FIG. 5.

Note that all times referred to in the message are in terms of the subscriber's local time. If the central station is in a different time zone than the subscriber, the CSC uses the Subscriber Timezone and Subscriber Daylight Savings Flag from the Subscriber File to calculate subscriber local time. This implies that the date and time on the CSC computer must be set accurately, and that the CSC software is smart enough to know whether a daylight savings adjustment needs to be made based on the current date.

3.3.3 LOG_CONFIGURATION_REQUEST

The LOG_CONFIGURATION_REQUEST message has the following format:

Type='L'

Data=None

The ACK returned by the Terminal has two characters in the data portion:

Disk log code=

'S' if successfully logged on disk

'E' if error writing to disk

'N' if disk logging is currently turned off at Terminal

Printer log code=

'S' if successfully logged on printer

'E' if error writing to printer

'N' if printer logging is currently turned off at Terminal 3.3.4 OPERATOR_CONFIRMATION_REQUEST The OPERATOR_CONFIGURATION_REQUEST message has the following format:

Type='O'

Data=None

The ACK returned by the Terminal has one character in the data portion:

Operator configuration code=

'R' if message received and confirmed

'C' if message received and call from alarm company desired

'E' if message was not received properly

'T' if locally set timeout period expired before operator responded (CSC will have its own timeout, which may be longer or shorter than the local timeout)

'N' if operator confirmation is currently turned off (This would always be the case at corporate subscriber and insurance company sites.)

Note that if a CAD system is hooked up to an ECC Terminal, the event data is transferred to it over the third RS-232 port. When the CAD system brings the information to the screen, the CAD operator is presented with the same response options as the regular operator. This response code is relayed back over the RS-232 port and used to select the operator confirmation code described above.

4 DATABASE SPECIFICATIONS

4.1 Central Station Computer (CSC)

The CSC has five files:

(1) Event log (2) Central Station ID File (3) Terminal ID File (4) Secondary Contact File (5) Subscriber File 4.1.1 Event Log File The event log is simply a record of each transmission from the central station to a Terminal. It consists of all of the fields in the EVENT_DATA message plus the subscriber ID, plus six additional groups of fields associated with each Terminal destination. The groups of fields associated with each Terminal include a message status field, and a date and time of transmission field.

| field description | # chars |
|---|---|
| . . . fields from EVENT_DATA message, except for Current Date | |
| . . . and Time, plus the following: | |
| Subscriber ID | 15(AN) |
| ECC Terminal Name | 32(AN) |
| ECC Terminal City | 32(AN) |
| ECC message status | 5(AN) |
| ECC Transmission/Cancel Date and Time (YYMMDDHHMMSS) | 12(N) |
| AHJ Terminal Name | 32(AN) |
| AHJ Terminal City | 32(AN) |
| AHJ message status | 5(AN) |
| AHJ Transmission/Cancel Date and Time | 12(N) |
| Insurance Carrier Terminal Name | 32(AN) |
| Insurance Carrier Terminal City | 32(AN) |
| Insurance Carrier message status | 5(AN) |
| Insurance Carrier Transmission/Cancel Date and Time | 12(N) |
| Insurance Broker Terminal Name | 32(AN) |
| Insurance Broker Terminal City | 32(AN) |
| Insurance Broker message status | 5(AN) |
| Insurance Broker Transmission/Cancel Date and Time | 12(N) |
| Subscriber Headquarters Terminal Name | 32(AN) |
| Subscriber Headquarters Terminal City | 32(AN) |
| Subscriber Headquarters message status | 5(AN) |
| Subscriber Headquarters Transmissiòn/Cancel Date and Time | 12(N) |
| APPLICANT/other Terminal Name | 32(AN) |
| APPLICANT/other Terminal City | 32(AN) |
| APPLICANT/other message status | 5(AN) |
| APPLICANT/other Transmission/Cancel Date and Time | 12(N) |

The format of the fields mentioned above is as follows. If the field is null (just a line feed and no actual characters), a message was not intended to be sent to this particular Terminal. If the field is not null, each byte has the following meaning:

byte 1—Completion Status Code byte 2—Disk Log Code from Terminal byte 3—Operator Confirmation Code for Terminal byte 4—Cancel Status Code The completion status code minimally has the following possible values:

'Q'—Message is queued waiting to be sent to this terminal

'S'—Successful transmission

'C'—Failure to connect (no initial carrier signal)

'B'—Broken connection (carrier lost during transmission)

'I'—Failure to receive initial ACK from terminal ID. Could mean noisy lines or dialing into a modem that was not running our software 'A'—Access code violation (the ID, access code packet exchange failed)

'R'—Retry failure; maximum number of retries was reached trying to send a particular packet (probably means a bad connection)

The above information is recorded in the event log at message transmission time as a permanent record of the success or failure (and reason for failure) of the transmission.

The Cancel Status Code is blank unless the operator removed the message from the pending message queue before it could be successfully transmitted. In that case, this code indicates the reason that the message was removed (verbal contact made, etc.). 4.1.2 Central Station ID File The central station ID file consists of only one record, which contains the CSC's ID, name, city, and state. An image of this file is kept in main memory for quick access. Each field is on a separate line as follows:

| field description | # chars |
|---|---|
| Central Station ID (Primary Key) | 15(AN) |
| Central Station Name | 32(AN) |
| Central Station City | 32(AN) |
| Central Station State | 2(A) |
| Central Station Telephone Number | 10(N) |
| Central Station Daylight Savings Flag (Y/N) 'Y' if daylight savings applies (default), else 'N' | 1(A) |
| APPLICANT Access Code | 15(AN) |
| Message Acknowledgment Timeout Maximum time (seconds) to wait for acknowledgment from Terminal operator (ECC sites only). | 3(N) |
| Central Station Dialing Prefix | 20(AN) |

The Central Station Dialing Prefix mentioned above is the dialing prefix which must be used when dialing out of the central station. For example, it may contain a local Sprint access number followed by a Sprin access code. This prefix may also contain codes indicating delays, wait for tone, etc.

4.1.3 Terminal ID File

The Terminal ID file contains information about each Terminal. An image of this file is kept in main memory for quick look-up of telephone numbers and access codes. The fields are each on separate lines as follows:

| field description | # chars |
|---|---|
| Terminal ID (Primary Key) | 15(AN) |
| Terminal Access Code | 15(AN) |
| Terminal Name | 32(AN) |
| Terminal City | 32(AN) |
| Terminal State | 2(A) |
| Terminal Computer Telephone Number | 10(N) |
| Terminal Voice Telephone Number | 10(N) |
| Test Frequency Schedule (number of hours between tests) | 4(N) |
| Date and Time of Last Transmission (YYMMDDHHMMSS) | 12(N) |

The Terminal ID is the unique identifier for a given Terminal. It follows a convention which allows the CSC software to determine whether or not a specified Terminal is an ECC site. The reason for adopting such a convention is so that the CSC software has a way of knowing which Terminals are expected to have operator acknowledgement of messages.

The Test Frequency Schedule field above is the number of hours between scheduled test transmissions. A value of zero in this field means that no test transmissions will be sent.

The Date and Time of Last Transmission field keeps track of the date and time of the last transmission from the CSC to the Terminal, regardless of whether it was a test transmission or not. Therefore, the only time that test transmissions are sent is when there have been no transmissions at all for the length of time defined in the Test Frequency Scheduled field.

Since the scheduled time for a test transmission is reset every time a normal transmission occurs, test transmissions tend to spread out automatically so there is no need to worry about Terminals being bombarded with a large number of test transmissions in a short period of time.

4.1.4 Secondary Contact File

The Secondary Contact File contains information about each secondary contact alarm company. If the central station does not have any "dealer" alarm companies and/or responding guard service companies, this file will be empty. The Subscriber File contains the Secondary Contact Identification which "points" to the appropriate record in this file. In other words, the value of the Second Contact Identification field in the Subscriber file is used to find the corresponding record in this file.

| field description | # chars |
|---|---|
| Secondary Contact Identification (Primary Key) | 15(AN) |
| Secondary Contact Name | 32(AN) |
| Secondary Contact Telephone Number | 10(N) |

4.1.5 Subscriber File

The Subscriber File contains information about each subscriber as follows:

| field description | # chars |
|---|---|
| Subscriber ID (Primary Key) | 15(AN) |
| Subscriber Name | 32(AN) |
| Subscriber Primary Person Contact Name | 32(AN) |
| House Number (or business number) | 8(AN) |
| House Number Suffix (apartment number, floor, suite) | 4(AN) |
| Street Directional | 2(A) |
| Street | 48(AN) |
| Alternate Street Address | 62(AN) |
| Community (city) | 32(AN) |
| State | 2(A) |
| ZIP code | 9(N) |
| Subscriber Timezone (see paragraph below) | 2(AN) |
| Subscriber Daylight Savings Flag (Y/N) | 1(A) |
| System Types | 40(AN) |
| List of signal types that can be generated here (i.e., BA, FA, HU, EMS, etc.). The list is separated by semi-colons. | |
| Event Types | 80(AN) |
| List of event types that can be associated with at least one of the signal types. The list is separated by semi-colons. | |
| Notification Matrix | 100(AN) |
| This is an array of flag bytes that form a one-to-one correspondence with all possible combinations of Signal Types and Event Types. See paragraph below which explains this matrix. Note that the number of signal types multiplied by the number of event types cannot exceed the size of this matrix. | |
| Signal Code | 15(AN) |
| Permit Number | 15(AN) |
| Special Information | 80(AN) |
| (location assist; handicapped; special hazards) | |
| Secondary Contact Identification | 15(AN) |
| ECC Identification | 15(AN) |
| Authority Having Jurisdiction (AHJ) Identification | 15(AN) |
| Insurance Carrier Identification | 15(AN) |
| Insurance Broker Identification | 15(AN) |
| Subscriber Headquarters Location Identification | 15(AN) |
| APPLICANT/Other Identification | 15(AN) |
| Note: the above 6 fields point to the Terminal ID File. | |
| Number of Annual Inspections (1 to 52) | 2(N) |

The Subscriber Timezone is a two character field which indicates the difference in time zones between the subscriber and the central station. If the two are in the same time zone (the default), a "0"(zero) is placed in this field. If the subscriber is one hour later, a "+1"would be placed in this field. Similarly, if the subscriber zone is one hour earlier than the central station zone, a "−1"would be placed in the field. The Subscriber Daylight Savings Flag indicates whether or not daylight savings is observed at the subscriber location. The default is yes ('Y').

The notification matrix is an array of bytes which is dimensioned by the number of signal types and event types. The first signal type in the Signal Type list may be thought of as a row subscript of zero into this array, the second signal type as a row subscript of one, etc. Similarly, the first event type in the Event Type list may be thought of as a column subscript of zero into this array. Therefore, if 's' is a zerobased index into the Event Type list, the index into the Notification Matrix byte array is simply calculated by multiplying 's' and 'e'. The value of each flag byte is an ASCII character which represents a binary value ranging between 0 and 63. The ASCII character is formed by adding the value of a space (32) to the binary value being represented. A binary value of zero means the specified combination of Signal Type and Event Type is not valid. A non-zero value indicates that messages should be sent to the Terminals specified by each bit that is set as follows:

000001—ECC Terminal
000010—AHJ Terminal
000100—Insurance Carrier Terminal
001000—Insurance Broker Terminal
010000—Subscriber Headquarters Location Terminal
100000—APPLICANT/other Terminal The APPLICANT/other bit is primarily intended for use in notification of a Terminal at APPLICANT for companies that wish to make use of statistical and reporting services provided by APPLICANT. If APPLICANT Terminal notification is not desired, this bit (and the associated field in the Subscriber File) may be used for notification of any Terminal defined in the Terminal File.

Note that while the storage method for the above array is somewhat complex (to reduce disk storage space), the software interface to the user need not be. The user can simply be prompted for each signal type, event type, and associated Terminal ID codes. The software can take care of building the lists and constructing the array of bit-mapped numbers.

4.2 Terminal Computers

The Terminal computer has three files:

(1) Event Log File
(2) Central Station ID file
(3) Terminal ID File 4.2.1 Event Log File The Terminal computer's main data file is the event log, which is simply a record of each transmission from the alarm companies. Each record consists of the Central Station ID, followed by a carriage returnline feed pair, and all of the fields in the EVENT_DATA message, each terminated by a carriage return-line feed pair.

Since the Terminals log events onto floppy disks, the event log will never be bigger than 360K. The software should print warning messages before the disk fills up completely so that an operator can insert a new floppy disk.

4.2.2 Central Station ID File

The next file is the Central Station ID File. This is also an ASCII text file. It specifies a list of valid Central Station IDs, which is checked every time a transmission is received from an alarm company. Each Central Station ID is contained on a separate line in the file. An image of this file is also kept in main memory to speed up verification of Central Station IDs.

4.2.3 Terminal ID File

The last file is the Terminal ID file. This file consists of only one record, which contains information about the Terminal, each field on a separate line. An image of this file is kept in main memory for quick reference. The fields are as follows:

| field description | # chars |
|---|---|
| Terminal ID | 15(AN) |
| ID is sent to CSC in ACK to CENTRAL_STATION_ID packet. | |
| Terminal Access Code 1 | 15(AN) |
| Terminal Access Code 1 "from" date (YYMMDD) | 6(N) |
| Terminal Access Code 1 "to" date (YYMMDD) | 6(N) |
| Terminal Access Code 2 | 15(AN) |
| Terminal Access Code 2 "from" date (YYMMDD) | 6(N) |
| Terminal Access Code 2 "to" date (YYMMDD) | 6(N) |
| Terminal Name | 32(AN) |
| Terminal City | 32(AN) |
| Terminal State | 2(A) |
| Terminal Zip Code | 9(N) |
| Terminal Computer Telephone Number | 10(N) |
| Terminal Voice Telephone Number | 10(N) |
| Number of Modem Lines ('1' or '2') | 1(N) |
| Number of Printers ('1' or '2') | 1(N) |
| Operator Confirmation Flag ('Y' or 'N') | 1(A) |
| Operator Acknowledgment Timeout | 3(N) |
| Maximum number of seconds to wait for operator acknowledgment. | |
| Disk Logging Flag ('Y' or 'N') | 1(A) |
| Printer Logging Flag ('Y' or 'N') | 1(A) |
| CAD Protocol (null if no CAD system attached) | 5(AN) |
| System Management Computer Access Code | 15(AN) |
| Terminal Dialing Prefix | 20(AN) |

The Terminal Dialing Prefix mentioned above is the dialing prefix which must be used when dialing out of the Terminal (i.e. to system management computer). For example, it may contain a local Sprint access number followed by the Sprint access code. This prefix may also contain codes indicating delays, wait for tone, etc.

A special note is in order with regard to the CAD Protocol field. Initially, the Terminal software is programmed to interface with CAD systems only in the manner described in this specification. CAD system vendors wishing to communicate with APPLICANT Terminals will need to modify their software to recognize this protocol. If such a CAD system is attached, the CADS Protocol field should be set to "TERMINAL". This implies that the CAD system can communicate using the standard APPLICANT protocol. If no CAD system is attached, this field should be set to null. APPLICANT may in the future support additional CAD interface protocols, possibly including protocols used by existing CAD systems. If support for additional protocols is added in the future, the desired protocol for a particular CAD system will be indicated by different values in the CAD Protocol field.

4.3 SYSTEM MANAGEMENT COMPUTER

The system management computer database consists of the following files:

(1) CSC File (2) Terminal File

4.3.1 CSC File

The CSC File has one record for each CSC on the system as follows:

| CSC File description | # chars |
|---|---|
| Central Station ID (Primary Key) | 15(AN) |
| Central Station Name | 32(AN) |
| Central Station Street Address | 62(AN) |
| Central Station City | 32(AN) |
| Central Station State | 2(A) |

-continued

| CSC File description | # chars |
|---|---|
| Central Station ZIP Code | 9(N) |
| Central Station Official Contact Person | 32(AN) |
| Central Station Official Contact Person Telephone Number | 10(N) |
| Central Station Daylight Savings Flag (Y/N) | 1(A) |
| 'Y' if daylight savings applies (default), else 'N' | |
| Terminal IDs | 320(AN) |
| List of valid Terminal IDs, separated by commas. Provision must be made to expand the size of this field at a later date. | |
| Update Access Flag (Y/N) | 1(A) |
| 'Y' if update access allowed from this CSC. | |

4.3.2 Terminal File

The Terminal File has one record for each CSC on the system as follows:

| Terminal File description | # chars |
|---|---|
| Terminal ID (Primary Key) | 15(AN) |
| Terminal Access Code 1 | 15(AN) |
| Terminal Access Code 1 "from" date (YYMMDD) | 6(N) |
| Terminal Access Code 1 "to" date (YYMMDD) | 6(N) |
| Terminal Access Code 2 | 15(AN) |
| Terminal Access Code 2 "from" date (YYMMDD) | 6(N) |
| Terminal Access Code 2 "to" date (YYMMDD) | 6(N) |
| Terminal Name | 32(AN) |
| Terminal Street Address | 62(AN) |
| Terminal City | 32(AN) |
| Terminal State | 2(A) |
| Terminal ZIP Code | 9(N) |
| Terminal Computer Telephone Number | 10(N) |
| Terminal Voice Telephone Number | 10(N) |
| Terminal Official Contact Person Name | 32(AN) |
| Terminal Official Contact Person Telephone Number | 10(N) |
| Central IDs | 320(AN) |
| List of valid central IDs, separated by commas. Provision will be made to expand the size of this field later. | |
| Update Access Flag (Y/N) | 1(A) |
| 'Y' if update access allowed from this Terminal. | |

5. SOFTWARE FUNCTIONAL SPECIFICATIONS

5.1 Central Station Computer (CSC)

The CSC software's main job is to forward alarm data to Terminals. To accomplish this, a database of subscribers and secondary contact (alarm or guard) companies must be maintained, and a fast and efficient method of entering event data for transmission is provided.

The CSC main menu has the following options:

(1) Process Event (2) Process Pending Messages (3) Update Subscriber File (4) Update Secondary Contact File (5) Update IDs and Access Codes (6) Subscriber Report (7) Update Passwords (8) Load Database The operator is required to enter a password to gain access to any of the above functions except for Process event and Subscribe Report. There is one master password which allows access to any function, and a list of secondary passwords which allow access to the other options. Each secondary password may be individually "set" to allow access to any or all menu options. The main point of the password feature is to control who is allowed to change the database. Any operator should be able to process events or run a report.

5.1.1. Process Event

This option allows the CSC to process an event. After gathering appropriate information from the operator, it logs the event in the Event Log, prints a copy of the event on the printer, and forwards the event to the designated Terminals.

When this option is first selected, it goes into a loop prompting for a Subscriber ID. The operator can either enter a Subscriber ID or press a key to exit back to the main menu. If a Subscriber ID is entered, the software displays a screen showing the subscriber information associated with that ID, and then asks if the record selected is the correct one. If the operator says no, he/she is prompted for another ID. If he/she says yes, the software continues prompting for additional information about the event. After the event has been processed, the software returns to the prompt for Subscriber ID, rather than to the main menu. This approach saves time when multiple events need to be processed quickly.

After the operator has confirmed that the Subscriber ID entered is correct, the cursor jumps to the next required input field. When the subscriber record is displayed asking for operator confirmation, it is displayed in such a way that all necessary prompts and information are on the screen. This allows the operator to simply "fill in" the form on the screen, rather than popping new prompts onto the screen after each field. This screen input function has the capability to do within-field editing (backspace, etc.) and the capability to use arrow keys to go back to previously entered fields and correct mistakes.

The first input field after the Subscriber record confirmation is the Signal Type field. If there is only one signal type listed in the Subscriber record, its value is displayed automatically in this field. In this case, the cursor moves automatically to the next field without stopping for operator input. In the other case, when more than one signal type is listed, the cursor stops for operator input, and the input is validated against the list.

The next input field is the Event Type field. If there is only one event type listed in the Subscriber record, its value is displayed automatically in this field. In this case, the cursor moves automatically to the next field without stopping for operator input. in the other case, when more than one event type is listed, the cursor stops for operator input and the input is validated against the list.

The next three input fields are the Location (zone) field, the Triggering Device Type field, and the Operator Instructions field. These are simply arbitrary alphanumeric strings input by the operator. The maximum length is dictated by the size of those fields in the EVENT_DATA message. The operator Instructions field is special in that when the cursor first moves to that field, the operator has a special key available which prints "FOLLOW-UP:" in the first part of the field and then waits for subsequent input. This special key makes available a short-hand method of prefixing the operator instructions with a standard phrase that indicates that this event is a follow-up to a previous event. The operator also needs to fill in the Agent Responding Field and the Key Holder Responding fields. These are single character fields that can have the values specified in the description of the EVENT_DATA message. There is also a Scheduled System Inspection and Date of Last Inspection field.

After all fields have been filled in (or intentionally left blank), the operator hits a special exit key to finish processing the event. At this point, the software returns to the Subscriber ID prompt, and the operator may begin to immediately process another event. Meanwhile, separate tasks within the software are logging the event onto the disk and printing a copy of the event. Also, transmission of the events to the various designated Terminals begin immediately. A queue is set up and maintained by a separate task so that transmissions continue regardless of what the operator is doing. Also, after each transmission, the Event Log is updated to show the status of the transmission, and a message is sent to the printer queue (which is also maintained by a separate task) indicating the date and time the message was transmitted and the name and address of the receiving Terminal. A very important point here is that the transmission queue is set up so that ECC messages always go in at a higher priority than non-ECC messages. For example, suppose that an operator has just finished processing an event and immediately begins to process another one. If he/she finishes processing the second event before the first one has been transmitted to all Terminals, the ECC message for the second event is placed in the queue ahead of any remaining non-ECC messages.

5.1.2 Process Pending Messages

This option allows the operator to process messages that have not been successfully transmitted. The operator is presented with a list of pending messages in priority order (ECC messages at the top). He/she may simply view the messages, or individually remove messages from the pending list. When a message is removed, the operator is prompted to choose from a standard set of reasons. A unique single character code will be associated with each possible reason, and the code corresponding to the operator's selection will be stored in the event log in the Cancel Status field. If a particular message is pending to more than one Terminal, the operator is given the option of canceling transmission to all Terminals (in which case the reason must be the same for all), or canceling them on an individual basis (so that a different reason code may be selected).

5.1.3 Update Subscriber File

The "Update Subscriber File" main menu option allows alarm company personnel to add new subscribers to the database, delete old ones, or update information about existing subscribers. When updating Signal Types and Event Types, the operator is able to choose from standard lists established by APPLICANT. The operator can add additional types, but should realize that Terminal personnel may not understand what is meant if non-standard types are used.

5.1.4 Update Secondary Contact Files

The "Update Secondary Contact File" main menu option allows alarm company personnel to add new secondary contact companies to the database, delete old one, or update information about existing ones.

5.1.5 Update IDs and Access Codes

The "Update IDs and Access Codes" option on the main menu requests that the Central Station ID File and the Terminal ID File be updated from APPLICANT for the calling CSC. When selected, the software dials out to the system management computer and requests an update. The system management computer verifies the calling CSC and downloads new copies of the affected files using Kermit file transfers. After the transfer is complete, the CSC prints out a copy of the information in each of these files showing the new values. The system management computer computer also prints out an identical list. The system management computer computer will also send an ASCII file containing a list of Terminals with which this central station is authorized to communicate. After the file has been transmitted, it will be printed. The printout will contain names and addresses and related information for each Terminal.

A backup procedure is provided for updating IDs and Access Codes in case the system management computer goes down for an extended period or the central station people want to update the codes themselves.

5.1.6 Subscriber Report

This option prints a list of current subscriber and associated information. The list may be restricted to subscribers having a particular Terminal ID on their list of Terminal destinations.

5.1.7 Update Passwords

This option requires the operator to enter the master password. Once this has been done, the master password, or any of the secondary passwords, may be viewed or changed. The secondary password list may contain only one password, or it may contain several Each secondary password has an associated list of allowable main menu functions. By using this feature, central station management may set up its own menu item access assignments. This function allows for secondary passwords to be added, deleted, viewed, or modified. The master password cannot be deleted, but it may be modified.

5.1.8 Load Database

This option allows for batch updates of the database. It would primarily be used by central stations which are already automated. This makes it easy for such stations to download their databases to the CSC to obviate the need for manually entering the information. This option prompts for a file name containing a list of transactions (i.e., add record, delete record, etc.) which are then applied to the existing CSC database.

5.1.9 Multitasking Considerations

The CSC program is divided into four tasks that may execute concurrently:

(1) Operator Task
(2) Modem Task
(3) Disk I/O Task
(4) Printer Task
(5) Test Scheduler Task The Operator Task takes care of all interaction with the operator screen. It uses the Modem Task to communicate over the serial port, and the Disk I/O Task to read and write to the disk. It sends messages to the Printer Task when it wants to print something. If the Modem Task, the Disk I/O Task, or the Printer Task have an error to report, they send a message to the Operator Task so that it will be displayed on the screen in the appropriate place.

The Modem Task handles sending messages to Terminals and also receiving updates from the system management computer. It maintains a prioritized queue of messages that need to be sent to Terminals, with ECC Terminals messages always getting the highest priority. Because it is a separate task, communications proceed in parallel with operator processing of a subsequent event. The Modem Task also keeps track of messages that failed to get through to a particular Terminal and retry them periodically.

The Disk I/O Task handles all disk input and output, keeping memory images of files that needed to be accessed quickly. It notifies the Operator Task of any disk access errors, and sends a message to the Printer Task to be printed as well.

The Printer Task maintains a prioritized queue of messages that need to be sent to the printer. Any errors encountered while printing will be reported to the Operator Task.

The Test Scheduler Task sleeps (be in an inactive state) most of the time, and just wakes up every couple of minutes to see if any test transmissions need to be sent. If so, it sends a message to the Modem Task and has it place a test transmission on the output queue at the lowest priority.

5.2 Terminal

The Terminal's main job is to capture and log events (transmissions) received from central stations (CSCs). The Terminal is also capable of printing, on request, a log based on a date range, and is capable of communicating with a CAD system by transferring event data to it and having the CAD system display the data on its Incident Screen. [Later enhancements will include various statistical reports based on Event Log Data.]

The Terminal software is able to handle two incoming calls simultaneously, both of which could be coming in at baud rates up to 2400 baud. Als, incoming characters are not dropped when the program is displaying information on the screen or printing.

The main menu of the Terminal software will have the following options:

(1) Log events
(2) Print event log
(3) Update IDs and access codes
(4) Configure printed form layout Incoming telephone lines will only be answered when the Log Events option has been selected. Incoming calls are never dropped while running this option (even if printing, etc.). This constraint necessitates two operating procedures which are employed to minimize delay due to unanswered calls;

(1) Operators at the Terminal site use the other main menu options only during periods of low call traffic.

(2) The CSC has a relatively short timeout period for letting the telephone ring. Moreover, it will not attempt to repeat unanswered calls, because the Terminal software may not be in Log Events mode. The procedure requires that if the minimum number of rings expires without an answer, the CSC operator is alerted immediately so that he can call over the voice telephone line.

5.2.1 Log Events

Selecting main menu option 1 puts the Terminal into the mode where it waits for calls for CSCs and records alarm events. This is where the program spends most of its time. When a message comes in, the message is recorded in the event log on disk, and is also sent to the printer. At an ECC site, an additional message is sent to the terminal screen asking for operator confirmation, and a repeating audible alarm (beep) sounds. The operator is given three response options:

(1) Message received properly.
(2) Message received properly, but please call anyway.
(3) Please call, message was NOT received properly.

5.2.2. Print Event Log

The second option on the main menu is to print the event log. The printouts are generated in the same format as the original printout when the alarm message was received. The operator is asked to select a date range for log events to be printed. The default is to print the entire log. If starting and ending dates are specified, only messages received between those dates are printed. Both dates are included in the listing.

5.2.3 Update IDs and Access Codes

The third option on the main menu is to update IDs and access codes. When selected, the software dials out to the system management computer and requests an update. The system management computer downloads new copies of the Central ID file, and the Terminal ID file for the calling Terminal. These are simply Kermit file transfers of the appropriate files. The Terminal software then prints out a copy of the information in each of these files showing the new values. The system management computer also sends an ASCII file containing a list of central stations with which this Terminal is authorized to communicate. After the file has been transmitted it will be printed. The printout contains names and addresses and related information for each central station.

A backup procedure is provided for updating IDs and Access Codes in case the system management computer goes down for an extended period or the Terminal people want to update the codes themselves.

FIG. 6 illustrates a proposed example of an event notification report as also set forth below in Table 2.

TABLE 2

ALARM SYSTEM
EVENT NOTIFICATION REPORT
(SAMPLE FORM)

| | |
|---|---|
| Message Transmission Date & Time: 11/03/86 23:08:30 | |
| Name: General Manufacturing Corp. | |
| Street Address: 10832 #308 NE Jackson Blvd | |
| City: Minneapolis State: MN ZIP: 55402-2345 | |
| System Type: AFA | Event Type: Alarm |
| Location: 3rd Flr | Triggering Device: Smoke Det |
| Agent Responding? N | Key Holder Responding? C |
| Permit Number: 32051 | Signal Code: 38C15(MFD) |
| Monitoring Central Station: | Security CS |
| Central Station Phone No.: | (201)332-0123 |
| Secondary Contact Name: | Mdwst Patrol |
| Secondary Contact Phone No.: | (612)332-9943 |
| Time of Event: | 23:07:15 |
| Date & Time of Most Recent Previously Reported Event: | 02/10/86 03:15 |
| Special Information: | Fire Stairwell Access from Rear; HCL in Mfg Area |
| Central Station Operator Comments: | |
| User Primary Contact Name: | John Doe |
| This Message Sent to: | Fire Department Minneapolis |

5.2.4 Configure Printed Form Layout

The fourth option on the main menu is to configure the way the printouts of alarm events look. There is a default layout for printing these events if this configuration option is not used. There is an option to configure the page length definition (default 11 inches). This option also allows the user to enter row and column addresses for each printout field (relative to the upper left corner) and a maximum field length (output exceeding that length would be truncated). For each printout field the user can specify one of the following:

(1) A literal test string (i.e. a "label" in front of a data field).

(2) A single field from the alarm event data record.

(3) Multiple fields from the alarm event data record. In this case, the user is prompted for a delimiter character to insert between each field. The output from the data record fields is concatenated (and possibly truncated) and placed in the appropriate field on the printout.

After a preliminary printout option has been selected, a sample printout is made, followed by a question asking if the configuration is correct. If not, the user may alter the configuration again, or may quit, leaving the original configuration intact. After the printout configuration option has been used, the values specified are saved in a special file and read into memory next time the program is executed so that all subsequent printouts will use the new print format.

5.2.5 Multitasking Considerations

The Terminal program is divided into up to seven tasks that execute concurrently:

(1) Operator Task
(2) Modem Task 1
(3) Modem Task 2 (if second incoming line)
(4) Disk I/O Task
(5) Printer Task 1
(6) Printer Task 2 (if second printer in use)
(7) CAD Task (If CAD system attached)

The operator Task takes care of all interaction with the operator screen. When logging events it accepts messages from either Modem Task 1 or Modem Task 2 (if running), and asks for the appropriate operator confirmation.

The two modem tasks could be identical code, except that one is initialized to work with port COM1 and the other is initialized to work with port COM2. These tasks handle receiving messages from CSCs and also receiving updates from the APPLICANT computer. Because the modem task run concurrently with other tasks, messages can be accepted even when reports are being printed or when communication is occurring with a CAD system.

The Disk I/O Task handles all disk input and output, keeping memory images of files that need to be accessed quickly. It notifies the Operator Task of any disk access errors, and sends a message to one of the Printer Tasks to be printed as well.

Each Printer Task maintains a prioritized queue of messages that need to be sent to its printer. The two task utilize identical codes, except that they are initialized to use different printer ports. Any errors encountered while printing are reported to the Operator Task.

The CAD Task receives messages from both modem tasks, queue them up, and relay them to the CAD system. The operator confirmation code returned from the CAD system is relayed back to the appropriate modem task so that the response code could be transmitted back to the CSC.

5.3 System Management Computer

The main menu of the system management computer software will have three options:

(1) Wait for call
(2) Update CSC File
(3) Update Terminal File

System management computer has separate telephone line dedicated to accept incoming calls from CSCs or Terminals. The modem is set to auto answer so that it will always answer, even if the system management computer is being used for another purpose. In that case, the sound of the modem answering the call alerts system management computer personnel to quickly start the system management computer software program described here and select main menu option one. If system management computer did not want to accept a call at that time, or if no one was there and the computer was not left in the "Wait For Call" mode, the modem would hand up after a preset timeout period.

5.3.1 Wait For Call

The "Wait For Call" main menu option puts the system management computer in a mode where it is waiting for calls from CSCs or Terminals (remote computers) for the purpose of updating their ID and access code files. The remote computer sends a Kermit SendInit packet and system management computer responds with the appropriate ACK packet. The remote computer then sends its ID and system management computer's access code in a packet of type 'I'. If these cannot be verified, the system management computer hangs up and prints a message of the erroneous access attempt. Otherwise, the remote computer puts itself into the Kermit mode necessary to receive files. The system management computer looks up the necessary information to update the remote computer's ID and Access Code files, puts this information into temporary files, and then does a Kermit file transfer to update the remote computer. Upon completion of the transfer session, both sides hang up. The system management computer prints out a message indicating which remote computer was updated, and the date and time.

5.3.2 Update CSC File

The "Update CSC File" option allows system management computer to add new records to the CSC File, delete old ones, or update information in an existing record.

5.3.3 Update Terminal File

The "Update Terminal File" option allows system management computer to add new records to the Terminal File, delete old ones, or update information in an existing record.

MODE OF OPERATION

The present invention establishes a standard transmission protocol for alarm companies to use and establishes and defines data that is transmitted. The data comprises important and relevant subscriber related information. The data fields are of predetermined maximum sizes and are presented in a predetermined order. The transmitted information is then presented in a standard document format at the received end, such as at a police or fire department, corporate headquarters or an insurance organization. The presented document is then either printed as presented or modified by the receiving terminal to meet the recipient's needs, which may also include a computer-aided dispatch system. The uniqueness and novelty of the present invention is the uniformity with which the information is presented. Also, a single terminal at any location is able accept alarm or event reports from any central station that can send messages in the prescribed format.

The system can present a computer-aided dispatch system operator with an indication that an alarm or event has been received by a terminal. The operator can then request the alarm information to be forwarded to the computer-aided dispatch incident report system. Also, the operator can decide whether or not to accept the information and move the information through the system procedures of the computer-aided dispatch system, and if in-vehicle terminals are in use, the event messages can be received directly by responding emergency vehicles.

The hardware can either be off-the-shelf PC like computer equipment or can be special PC boards for insertion into personal computer like equipment, for purposes of illustration only and not to be construed as limiting of the present invention.

The communication links between the central station computer, the receiving location terminal, and the system management computer can be dedicated channels, leased channels from the telephone companies, data networks, or even RF communication links.

Various modifications can be made of the present invention without departing from the apparent scope thereof.

I claim:

1. System for transmitting event information comprising:

a. means for entering and storing location-related predetermined information for call-up in a central station computer, and in a manner for fitting into established data fields;

b. means for calling up and displaying said data for review and means for adding operator-provided information comments at said central station computer;

c. means in said central station computer for assembling event-related-data for transmitting from said central station computer;

d. means in said central station computer for incorporating said data into standardized event information messages including order of data and maximum size of each data field of the data;

e. means for transmitting said event information message including utilizing means of a standardized communication protocol from said central station computer to at least one remote location terminal connected to said central station computer during transmission of said even information message;

f. means for receiving a transmitted event information message at the remote location terminal; and, g. means for selecting and displaying remote-location-terminal-selected data fields from received the event information message according to means of a predetermined display format at said remote location terminal.

2. System of claim 1 including means for recording and storage for subsequent retrieval of said event information messages at said central station computer.

3. System of claim 1 including means for electronic recording and storage for subsequent retrieval of said event information messages at said remote location terminal.

4. System of claim 1 including means for designating for said remote location terminal an access code which is included in said event information messages before said message transmission can obtain access to said remote location terminal.

5. System of claim 1 including means for establishing an identification code for said central station computer whereby said code is used as part of said event information message to identify said central station computer by said remote location terminal.

6. System of claim 1 including means for storing a central station computer identification code in at least one of said remote location terminal to which said central station computer is authorized to send said event information messages.

7. System of claim 1 including means for acknowledging receipt of clear event information messages at said remote terminal location.

8. System of claim 1 including means for request repeat message transmission in the event of a garbled or incomplete message when received in said remote terminal location.

9. System of claim 1 including means for an event notification system management computer means to acknowledge and respond to requests for updates from said central station computer and said remote location terminal.

10. System of claim 1 including means for each of said central station computer to request access codes for all said remote location terminals to which said central station computer is authorized to send event information messages.

11. System of claim 1 including means for each of said remote location terminal to request identification codes for said central station computer that are authorized to send said event information messages to said remote location terminal.

12. System of claim 1 including a means for message transmission test capability that enables said central station computer to test and to send said event message to said remote location terminal after time intervals determined for each of said remote location terminal whereby a time interval is restarted each time a transmission is made from said central station computer to one of said remote location terminal which prevents unnecessary message transmission.

13. System of claim 1 including means for assigning and storing identification codes and remote location terminal access codes in said central station computer, and an event notification system management computer for communication to said central station computer and said remote location terminal.

14. System of claim 13 including means for said event notification system management computer to transmit to predetermined selected central station computer identification codes and selected remote location access codes of said central station computers and of said remote location terminals when queried by said central station computers and said remote location terminals in direct reply to said queries.

15. System of claim 13 including means for said event notification system management computer to change access code assigned to said remote location terminal and said central station computer.

16. System of claim 13 including means for said event notification system management computer to assign alternative access code to remote location terminal, and means to assign separate authorized time periods during which each access code will be accepted by said remote location terminal.

* * * * *